United States Patent [19]

Mitsui

[11] Patent Number: 5,277,040
[45] Date of Patent: Jan. 11, 1994

[54] CIRCULATION TYPE GAS PURIFICATION APPARATUS AND METHOD OF OPERATING THE SAME

[75] Inventor: Jin Mitsui, Chigasaki, Japan

[73] Assignee: Sumitomo Heavy Industries, Ltd., Tokyo, Japan

[21] Appl. No.: 822,608

[22] Filed: Jan. 15, 1992

[30] Foreign Application Priority Data

Jun. 4, 1991 [JP] Japan .................. 3-132914

[51] Int. Cl.⁵ .................... F25B 19/00
[52] U.S. Cl. .................... 62/51.1; 372/57; 372/59; 95/142
[58] Field of Search .............. 62/51.1, 18; 372/57, 372/59; 55/71

[56] References Cited

U.S. PATENT DOCUMENTS

| | | | |
|---|---|---|---|
| 4,369,048 | 1/1983 | Pence | 62/18 |
| 4,910,965 | 3/1990 | Lepofsky | 62/55.5 |
| 4,977,749 | 12/1990 | Sercel | 62/51.1 |

FOREIGN PATENT DOCUMENTS 0199934 11/1986 European Pat. Off. .

OTHER PUBLICATIONS

Patent Abstracts of Japan, vol. 10, No. 104 (E397)(2161) Apr. 19, 1986 of JP-A-60-242684, Dec. 1985.
Review of Scientific Instruments, vol. 52, No. 11, Nov. 1981, New York, pp. 1655-1656; K. O. Kutschke et al, "Rare Gas Recovery Systems for Rare Gas Halide Lasers".
Applied Physics Letters, vol. 32, No. 5, Mar. 1978, pp. 291-292; P. M. Johnson, "A Closed-Cycle Gas Recirculating System for Rare-Gas Halide Excimer Lasers".

*Primary Examiner*—Ronald C. Capossela
*Attorney, Agent, or Firm*—Frishauf, Holtz, Goodman & Woodward

[57] ABSTRACT

This invention relates to purification of a multicomponent gas while purifying and circulating a gas medium, such as a laser gas medium or the like. An object of the present invention is to provide a gas laser apparatus operating method and a gas laser apparatus in which it is easy to keep the laser output power constant for a long time. Disclosed is a method which performs laser oscillation while circulating a laser multicomponent gas medium containing a rare gas and in which the laser gas medium is circulated through an absorbent (10) which has been refrigerated to a temperature where all the components of the laser gas medium necessary for laser oscillation are not solidified.

8 Claims, 7 Drawing Sheets

CIRCULATION TYPE GAS PURIFICATION APPARATUS AND METHOD OF OPERATING THE SAME

BACKGROUND OF THE INVENTION

1. Field of the Invention

The present invention relates to a gas laser and particularly relates to a multicomponent gas purification, in which a gas medium such as a laser gas medium or the like is used while being circulated and purified.

2. Description of the Related Art

Although a description will be set forth, by way of example, of the case where the present invention is applied to a KrF excimer laser, the invention is not limited to such KrF excimer laser. For example, the invention may be applied to an ArF excimer laser, purification of multicomponent gases, and so on.

A KrF excimer laser is operated in a manner so that a mixture of gas of about 95-99% of Ne, about 1-5% of Kr and about 0.1-0.5% of $F_2$ is contained as a laser gas medium in a laser tube, which is made of metal, glass, plastics, ceramics or the like, and has mirrors disposed at the opposite ends of the laser tube, and light emission is caused in the laser gas medium through electric discharge to thereby cause resonance.

In general, fluorine gas is strong in reactivity and, in particular, fluorine gas excited by electric discharge or other excitation means is so strong in reactivity that a reaction between the florine gas and constituent materials of the laser vessel is caused by the electric discharge. This can generate a level of impurities in the laser gas which causes the laser output from the KrF excimer laser to decrease as the number of discharge pulses increases due to the presence of these impurities.

SUMMARY OF THE INVENTION

An object of the present invention is to provide a gas laser apparatus operating method in which it is easy to keep the laser output power constant for a long time.

Another object of the present invention is to provide a gas laser apparatus in which it is easy to keep the laser output power constant for a long time.

A further object of the present invention is to provide a gas purifying system for removing impurities from a multicomponent gas medium containing generated impurities to thereby make it possible to use the gas medium stably for a long time.

According to the present invention, there is provided a method for performing laser oscillation while circulating a laser gas medium containing a rare gas, during a method of operating a gas laser apparatus, characterized by the step of circulating said laser gas medium through an adsorbent refrigerated to a temperature at which all components of said laser gas medium necessary for laser oscillation are not solidified.

According to the present invention, there is also provided a gas laser apparatus comprising: a laser tube for containing a laser gas medium and for emitting laser light; an adsorbent vessel connected to said laser tube to form a circulation path and for containing adsorbent; and a refrigerator for refrigerating the inside of said adsorbent vessel to a predetermined temperature.

By using an adsorbent which has been refrigerated to a temperature where all the components of the laser gas medium necessary for laser oscillation are not solidified, impurities can be adsorbed so that the laser gas medium can be purified without reduction of the necessary components of the laser gas medium. This principle can be also applied to purification of multicomponent gas media other than the laser gas medium.

For example, impurities such as $CF_4$, etc. can be efficiently adsorbed without solidification of Kr by refrigerating the adsorbent to a temperature which is higher than the temperature of liquid nitrogen and lower than the temperature of dry ice.

As described above, a system using a multicomponent gas medium, such as a gas laser apparatus, etc., can be operated easily under a constant condition for a long time.

DESCRIPTION OF THE PREFERRED EMBODIMENTS

Before description of the embodiments of this invention, description of a conventional laser and the analysis thereof will be made.

Figure 8:
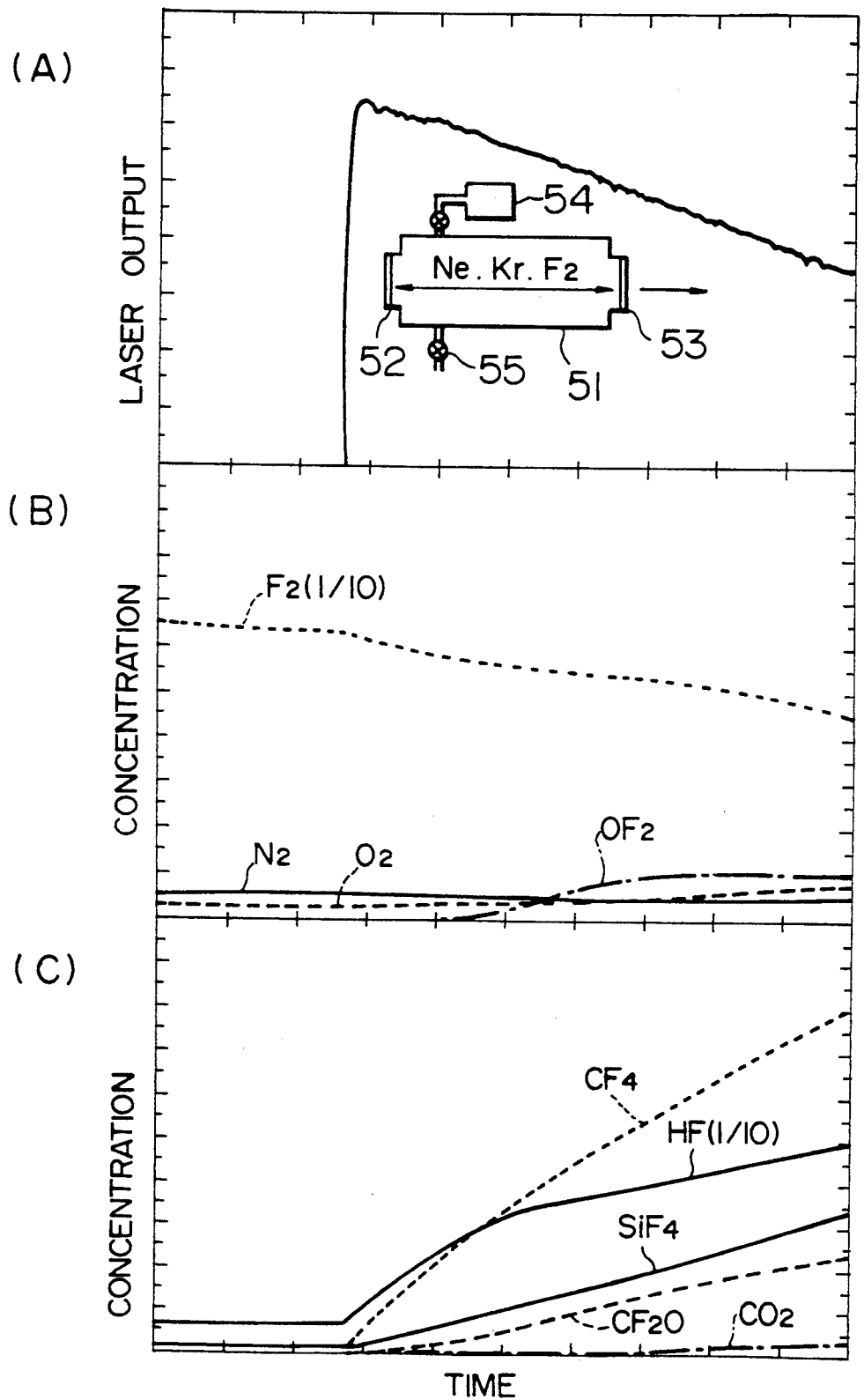
FIGS. 8A to 8C are graphs showing characteristics of a prior art type KrF excimer laser apparatus.

The characteristics of a typical conventional KrF excimer laser are shown in FIG. 8. As shown in FIG. 8A, a laser tube 51 has, at its one and the other ends respectively, a mirror 52 and a half mirror 53 having a desired reflectivity and a desired transmittance. Raw material gases are supplied from a gas source 54. The changes of the characteristics of the laser with the passage of time in the case where laser oscillation is continued under the condition that the inside of the laser tube 51 is first exhausted through an exhaust valve 55 and then fresh raw material gases are supplied from the gas source 54 to a predetermined pressure while the valve 55 being closed will be described hereinbelow. FIG. 8A shows laser output power, and of FIGS. 8B and 8C show gas component concentrations in the laser tube 51. In each graph, the abscissa represents the time.

As shown in FIG. 8A, laser output power is about zero before oscillation is caused. When oscillation is started, the laser output power reaches a large value rapidly. The laser output power, however, gradually decreases with the passage of oscillation time due to depletion of fluorine and increase of impurity concentrations.

As shown in FIGS. 8B and 8C, before the laser oscillation is started, the gas components in the laser tube 51 are kept almost constant and impurities such as $N_2$, $O_2$, HF and $SiF_4$ exist slightly. Though not shown, the concentrations of Ne and Kr, which are main components of the laser gas medium, are kept almost constant. When laser oscillation is started, the concentrations of impurities such as $CF_4$, HF, $SiF_4$, etc. gradually increase as shown in FIG. 8C. On the contrary, the concentration of $F_2$ as a constituent component of the laser gas medium gradually decreases. It is considered that the lowering of the laser output power is caused by both the increase of these impurities and the decrease of $F_2$ which is a necessary constituent component of the laser gas medium.

In order to attain a constant quantity of laser output power, it will be necessary to keep the inner pressure of the laser tube 51 constant by supplying fresh gases continuously from the gas source 54 while exhausting old gases through the exhaust valve 55, in the structure shown in FIG. 8A. According to this method, however, not only the expensive rare gas Kr is consumed wastefully but control of raw material gas supply and exhaust of gas medium becomes complex.

Therefore, a method in which gases in the laser tube are circulated through a liquid nitrogen trap to thereby remove generated halogenides and other impurities has been proposed. Because the fluorine component concentration in the laser gas decreases when halogenides are removed, fluorine gas should be supplied to the laser gas to complement the shortage thereof. In general, when a liquid nitrogen trap is used, Kr gas, as well as halogenides which are impurities, are trapped so that the amount thereof decreases. It is also necessary to add Kr. In order to keep laser output power constant for a long time, it is necessary to control the amount of added $F_2$ and Kr strictly. Further, in the liquid nitrogen trap, it is very difficult to bring all the circulating gases into contact with a cold trap surface which has been refrigerated to the temperature of liquid nitrogen evenly, and there is a possibility that impurities may pass through the trap.

Further, a method for performing both separation of halogens and trapping of the total amount of the halogens by using a getter trap using calcium, titanium, etc. has been proposed. Because the total amount of $F_2$ is trapped in this case, it is necessary to supply $F_2$ and, accordingly, it is necessary to control the quantity of addition thereof strictly.

As described above, in the conventional KrF excimer laser or the like using a multicomponent gas medium, it is not easy to keep the laser output power constant for a long time.

The following description concerns investigations and the result of experiments which form the foundation of the present invention.

It is widely known that a single component gas can be purified by using an adsorbent. It is also known that the capacity of adsorption increases when the adsorbent is cooled.

Figure 3:
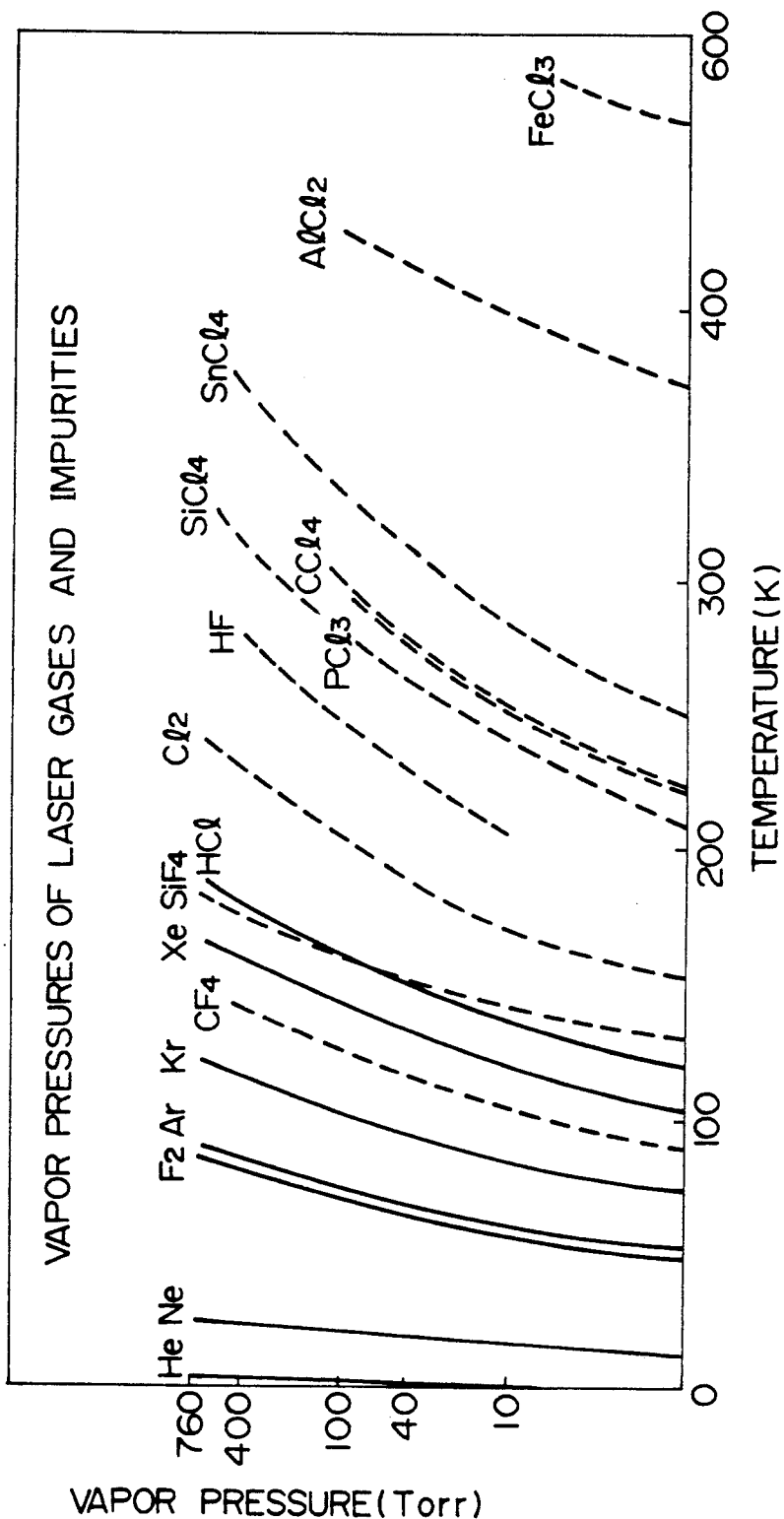
FIG. 3 is a graph showing vapor pressure curves of laser gases and impurities.

FIG. 3 shows vapor pressure curves of laser gases and impurities.

The laser gas medium in a KrF excimer laser contains Ne, Kr and $F_2$ as necessary components and contains $CF_4$, $SiF_4$, HF, etc. as main impurity gases. As is obvious from FIG. 3, among these necessary components and impurity gases, Kr and $CF_4$ have vapor pressure curves which are near each other. In the vapor pressure curve of Kr, the vapor pressure of Kr decreases rapidly as the temperature approaches that of liquid nitrogen.

Figure 4:
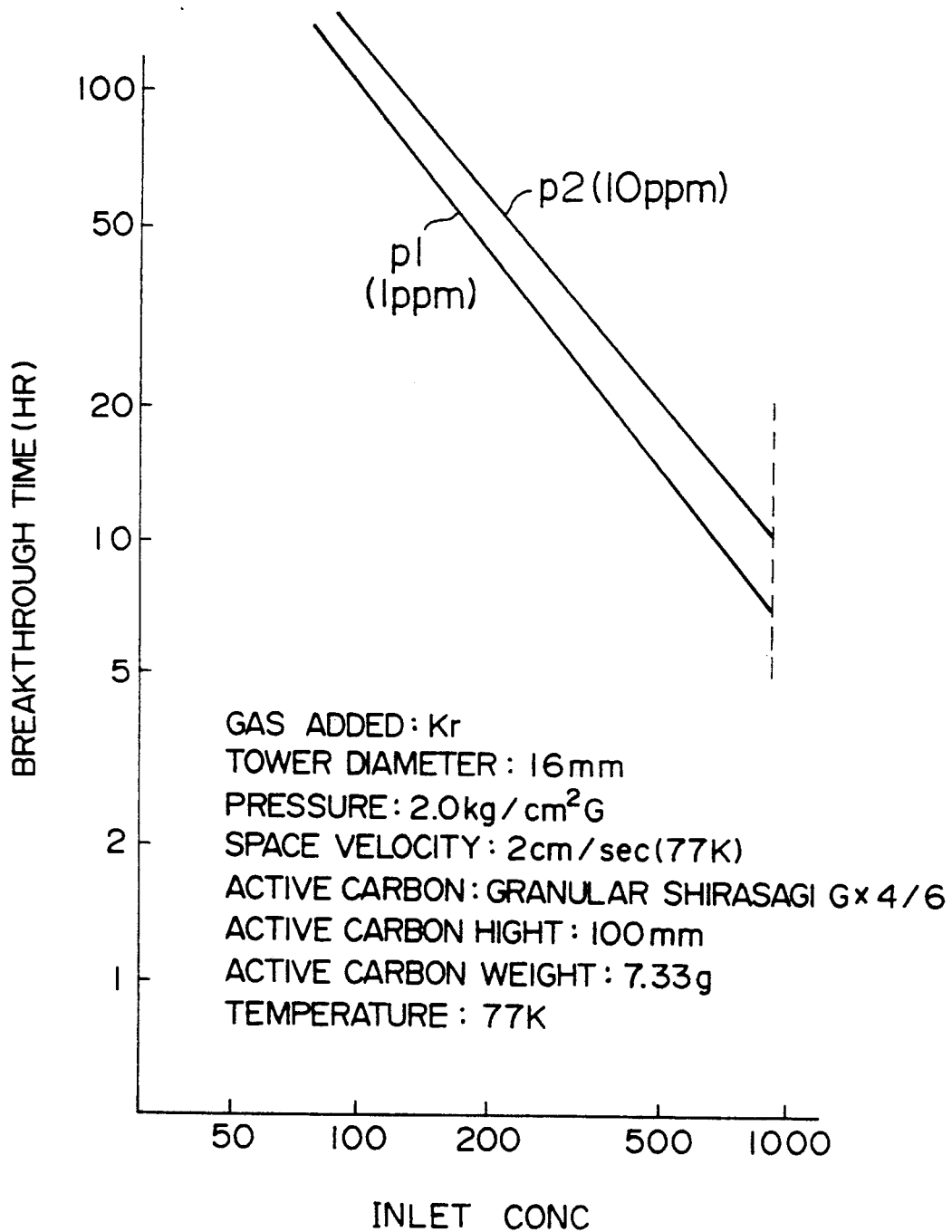
FIG. 4 is a graph showing an experimental result to form the foundation of the present invention.

FIG. 4 shows the result of an experiment where He gas mixed with Kr is allowed to flow through an adsorption tower which has been refrigerated to the temperature of liquid nitrogen. As shown in the graph, this experiment of adsorption was made through the steps of: using an adsorption tower having a diameter of about 16 mm; filling the adsorption tower with granular SHIRASAGI GX4/6 as an adsorbent to the height of about 100 mm (7.33 g); refrigerating the adsorbent to the temperature of liquid nitrogen; and feeding He:Kr gas into the adsorption tower. The pressure in the adsorption tower was about 2.0 $Kg/cm^2G$ (gauge pressure, total pressure: 3.0 atm.), and the space velocity was about 2 cm/sec (77K). In the graph, the abscissa represents the concentration of added Kr in terms of ppm, and the ordinate represents the breakthrough time when Kr passes through the adsorption tower. The characteristic p1 shows the breakthrough time when 1 ppm of Kr passes through the adsorption tower, and the characteristic p2 shows the breakthrough time when 10 ppm of Kr passes through the adsorption tower.

In the case where the Kr concentration at the inlet of the adsorption tower was not higher than 800 ppm, the ordinary adsorption characteristic was exhibited so that normal breakthrough time was attained. In the case where the Kr concentration was not lower than about 870 ppm, however, Kr was solidified so that the breakthrough time cannot be attained. That is, when a mixture gas containing Kr in the concentration of about 0.1% or more is introduced, Kr is not adsorbed on the adsorbent but is solidified. The critical vapor pressure of Kr at the temperature of liquid nitrogen is about 2.0 mmHg, and the limit concentration for the gas pressure of 3.0 atm. is about 870 ppm. Accordingly, it is so considered that Kr is solidified when a gas contains Kr in the concentration higher than 870 ppm. In general, the gas medium for KrF excimer laser contains about 1% of Kr. Considering both the aforementioned fact and the fact that the vapor pressure curves of Kr and $CF_4$ are very near each other as shown in FIG. 3, it is very difficult to set the temperature of the adsorption tower to a temperature where $CF_4$ is solidified without causing solidification of Kr.

Figure 5:
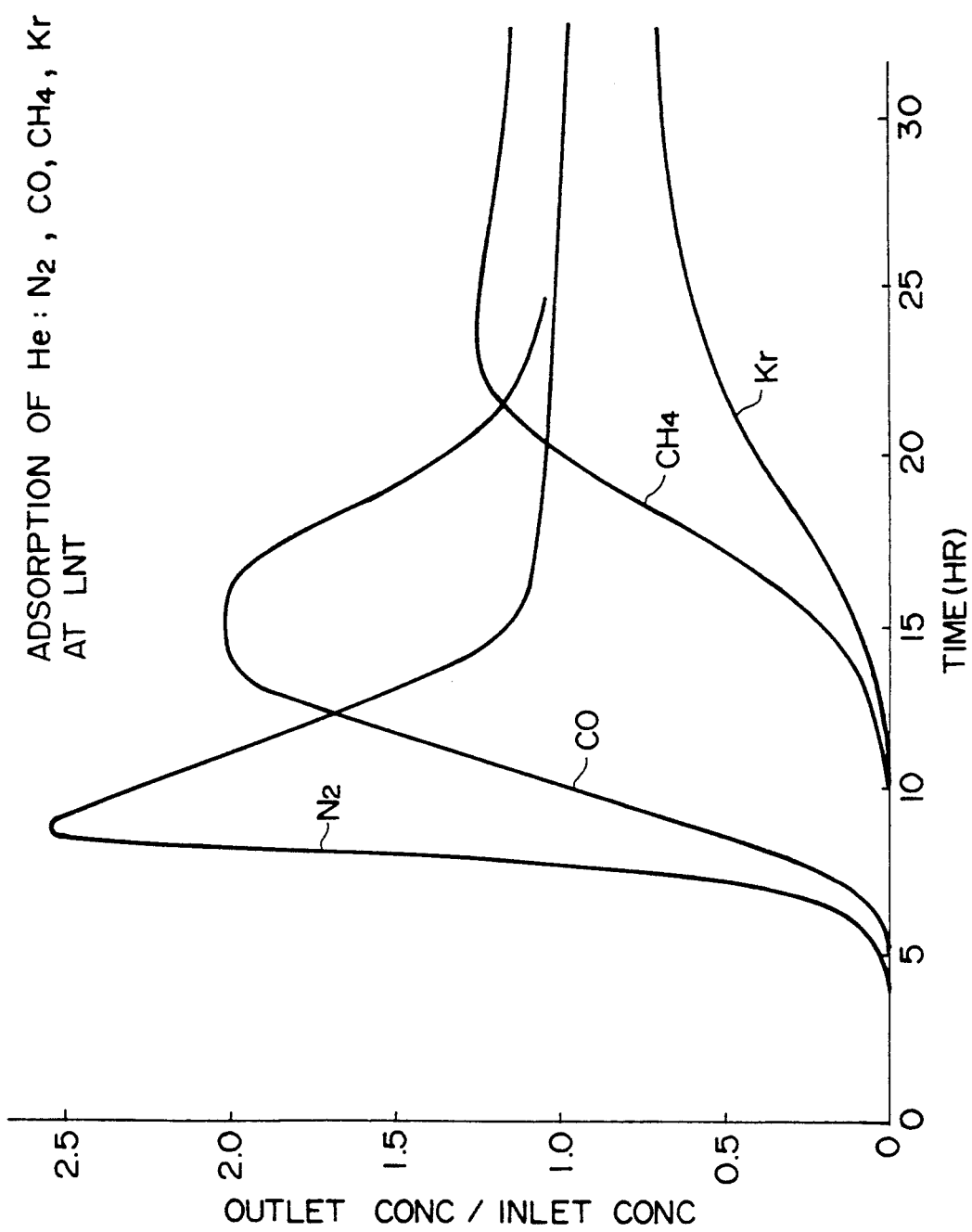
FIG. 5 is a graph showing another experimental result to form the foundation of the present invention.

FIG. 5 shows results of an adsorption experiment in which He gas mixed with $N_2$, CO, $CH_4$ and Kr was fed to the adsorption tower refrigerated to the temperature of liquid nitrogen. The abscissa represents the ratio of outlet concentration to inlet concentration, and the ordinate represents the time (in hours). The proportion of gas components added to He was about 23.1% of Kr, about 26.6% of $N_2$, about 23.7% of CO and about 26.6% of $CH_4$. The total concentration of the added components was about 1770 ppm (about 40 ppm of Kr, about 470 ppm of $N_2$, about 420 ppm of CO and about 470 ppm of $CH_4$). The pressure in the adsorption tower was about 3 atm, and the space velocity was about 1.98 cm/sec (77K). The adding rate of impurities was about 4.82 Ncc/min (in total). The flow rate of He gas was about 2725 Ncc/min. The amount of active carbon (granular SHIRASAGI GX4/6) was 16 mm$\Phi \times$100 mm (7.33 g).

At the outlet of the adsorption tower, $N_2$ first appeared and the 1 ppm breakthrough time thereof was about 3.7 hours. Successively, CO appeared and the 1 ppm breakthrough time thereof was about 4.8 hours. Next, $CH_4$ appeared and the 1 ppm breakthrough time thereof was about 8.1 hours. Next, Kr appeared and the 1 ppm breakthrough time thereof was about 9.2 hours. When the earlier gases $N_2$ and CO came out of the outlet, the concentrations thereof at the outlet became to levels respectively higher than the concentrations thereof at the inlet. Then, the outlet concentrations respectively decreased as other gases came out. Finally, the outlet concentrations of various gases became equal to the inlet concentrations. This shows the fact that a gas weak in adsorption force is replaced by a gas strong in adsorption force and is expelled from the surface of the adsorbent. In other words, this shows the fact that when a gas weak in adsorption force is adsorbed on the adsorbent and then a gas strong in adsorption force is brought into contact with the adsorbent, the gas strong in adsorption force is adsorbed preferentially so that the gas weak in adsorption force is desorbed from the adsorbent and appears at the outlet.

Figure 6:
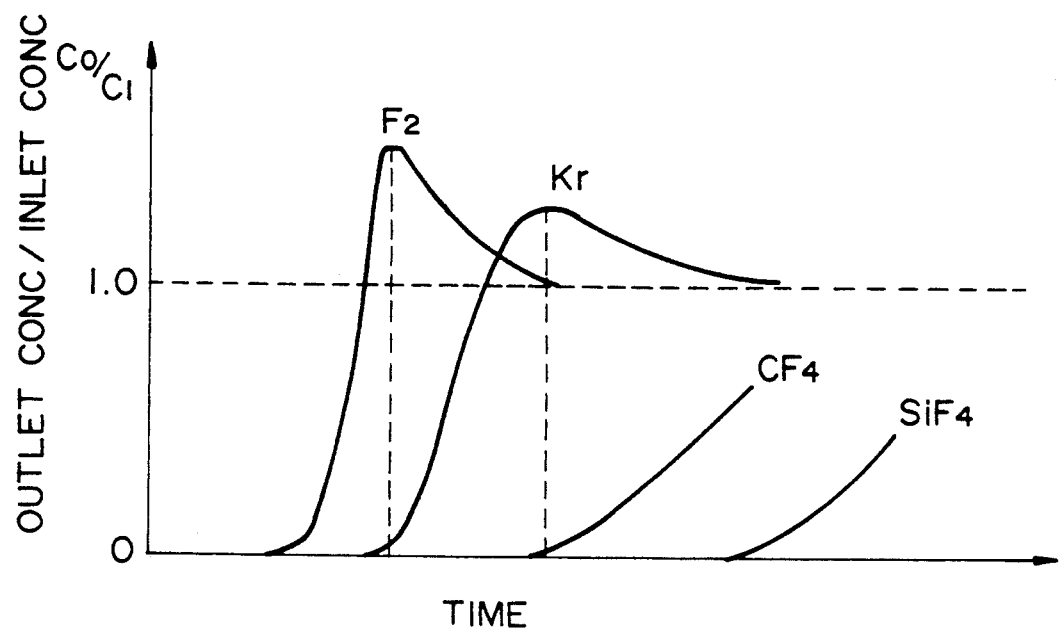
FIG. 6 is a graph for explaining a gas laser apparatus operating method according to an embodiment of the present invention.

FIG. 6 shows the adsorption characteristic expected when a mixture gas equivalent to the laser gas medium prepared by mixing $F_2$, Kr, $CF_4$ and $SiF_4$ in a main component Ne is fed into an adsorption tower while the adsorbent is refrigerated to a temperature higher than the temperature of liquid nitrogen. It is now assumed that the adsorbent is activated and is in an initial state in which nothing has been adsorbed.

All of $F_2$, Kr, $CF_4$ and $SiF_4$ in the mixture gas are adsorbed at an early stage so that these gases do not appear at the outlet of the adsorption tower. In due time, $F_2$ weak in adsorption force (high in vapor pressure) appears. The outlet concentration of $F_2$ increases to become higher than the inlet concentration thereof and then decreases gradually to approach the ratio of 1. As the outlet concentration of $F_2$ decreases, the outlet concentration of Kr increases. In due time, the output concentration of Kr becomes higher than the inlet concentration thereof and then decreases gradually to approach the ratio of 1.

Then, $CF_4$ and $SiF_4$ successively appear at the outlet. The fact that $F_2$ begins to appear at the output means the fact that $F_2$ weak in adsorption force appears at the outlet without adsorption in the surface of the adsorbent because the surface of the adsorbent is almost occupied by impurities. The fact that the outlet concentration of $F_2$ is higher than the inlet concentration thereof indicates the fact that $F_2$ adsorbed in the adsorbent is desorbed from the adsorbent and replaced by a component stronger in adsorption force. The fact that the outlet concentration of $F_2$ gradually approaches the inlet concentration thereof indicates the fact that adsorbed $F_2$ is gradually desorbed and then the amount of desorbed $F_2$ decreases. The fact that Kr begins to appear at the outlet indicates the fact that Kr weak in adsorption force begins to pass through the adsorbent without adsorption. The characteristic that the outlet concentration of Kr increases to become higher than the inlet concentration thereof and then the ratio approaches 1 indicates the fact that Kr adsorbed on the adsorbent is gradually replaced by a component strong in adsorption force and almost desorbed from the surface of the adsorbent.

Before $CF_4$ appears at the outlet, all the impurity gases are adsorbed on the adsorbent so that they do not appear at the outlet through $F_2$ and Kr which are constituent members of the laser gas medium may appear at the outlet. That is, before $CF_4$ appears, the KrF excimer laser can be operated in a state in which the amount of impurities is very small if the aforementioned gas purification is used. If the operation of the KrF excimer laser is stopped to re-activate the adsorbent when a predetermined concentration of $CF_4$ appears, not only the excimer laser operating time can be elongated but the amount of consumption of Kr can be reduced.

Figure 7:
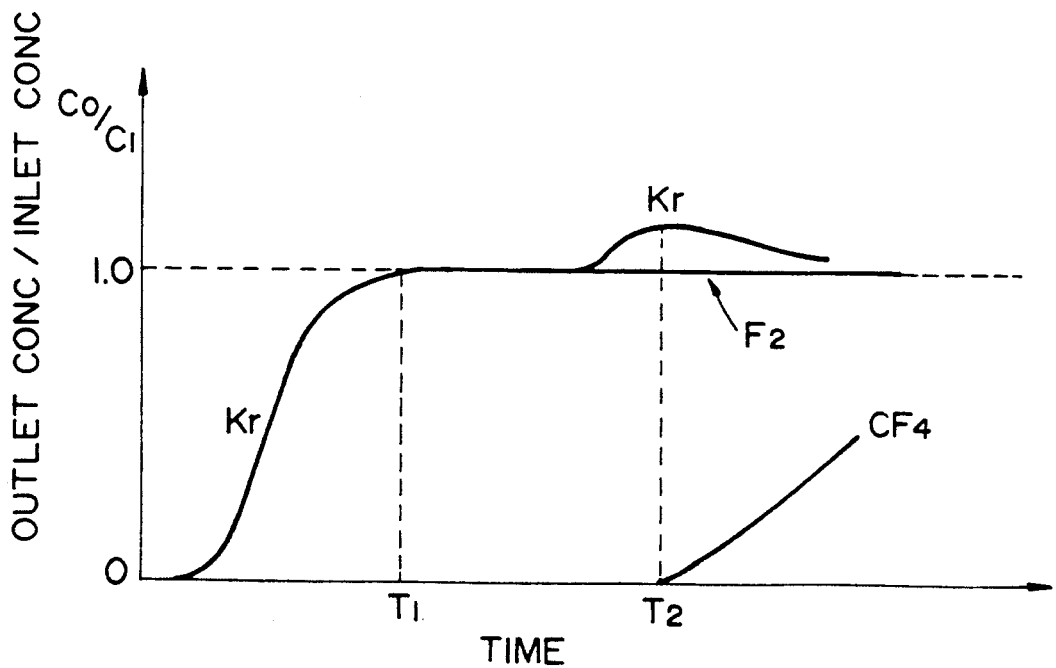
FIG. 7 is a graph for explaining a gas laser apparatus operating method according to an embodiment of the present invention.

In the case where the KrF excimer laser is operated by using the adsorption characteristic shown in FIG. 6, both $F_2$ and Kr are initially adsorbed on the adsorbent so that both the $F_2$ content and the Kr content in the laser gas medium decrease. If the excimer laser is to be operated in a constant condition, it is preferable that a shortage of these components is supplied. FIG. 7 shows the adsorption characteristic for explaining a further improved laser operating method. In FIG. 7, Kr exhibiting the strongest absorption force in the KrF laser gas medium is adsorbed to the saturation concentration on the adsorbent before the operation of the laser is started. After Kr is adsorbed to the saturation concentration on the adsorbent, the adsorption of the laser gas medium is started at time T1 and, at the same time, the operation of the excimer laser is started. Because the adsorbent reaches the saturation concentration for Kr, Kr and $F_2$ which is weaker in adsorption force than Kr are not adsorbed any more. Then, as impurity gases are produced, they are preferentially adsorbed on the adsorbent so that Kr having been already adsorbed is desorbed from the adsorbent. By the substitution of the adsorbed substance, the outlet concentration of Kr becomes higher than the inlet concentration thereof and then gradually becomes equal to the inlet concentration thereof. Before time T2 when $CF_4$ as one of impurities comes out of the outlet of the adsorbent, the laser gas medium is kept in a constant concentration and in high purity.

Around the time T2, the concentration of Kr increases. In general, the concentration of produced impurities is very low so that there is little influence on the concentration of Kr. Accordingly, there is no change in the proportion of components of the gas medium to interfere with the operation of the laser. If the KrF excimer laser is operated up till the time T2 (breakthrough time of $CF_4$) at which an impurity gas appears at the outlet and if the adsorption tower is re-activated thereafter, a gas purifying system can be provided in which the laser gas medium is kept in high purity and in a constant concentration.

The aforementioned adsorption characteristic can be generally applied to gas purification where adsorption force of impurity gas to be removed is higher than those of the component gases of a mixture gas of interest, as well as purification of the KrF excimer laser gas medium.

Figure 1:
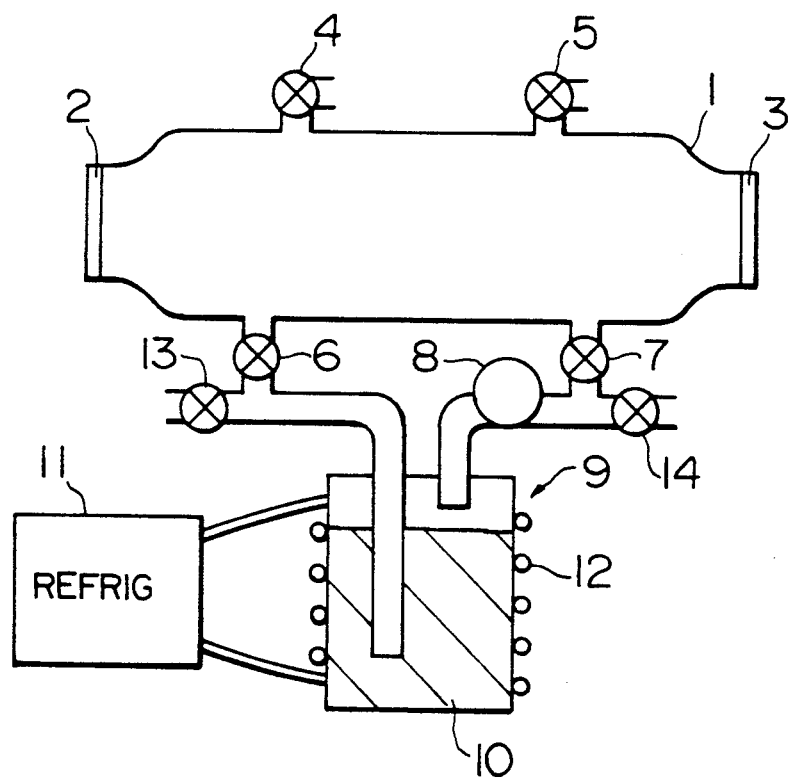
FIG. 1 is a schematic diagram showing a KrF excimer laser apparatus according to an embodiment of the present invention.

FIG. 1 shows a multicomponent gas circulation type KrF excimer laser apparatus using the aforementioned gas purifying method.

A laser tube 1 has mirrors 2 and 3 provided respectively at its opposite ends to form a resonator. The laser tube 1 is connected to various pipings such as a gas source pipe, a gas purifying system pipe, an exhaust pipe, etc. through valves 4, 5, 6 and 7. For example, the valve 4 is connected to the laser gas medium source, and the valve 5 is connected to the evacuating system. The valve 6 is connected to the inside of an adsorption tower 9 containing an adsorbent 10. The upper space of the adsorption tower 9 is connected to the valve 7 through a pump 8. The adsorption tower 9 is connected to a purge gas supply source and the evacuating device through valves 13 and 14 respectively. The absorption tower 9 can be refrigerated to an arbitrary temperature between the temperature of liquid nitrogen and the temperature of dry ice by a gas refrigerant in a refrigeration pipe 12 connected to a refrigerator 11.

When the KrF excimer laser is to be operated, the adsorbent 10 is activated and then adsorbed to the saturation concentration in advance. The inside of the adsorption tower 9 is refrigerated to a temperature higher by a predetermined value than the temperature of liquid nitrogen by the refrigerator 11 so that the components in the laser gas medium are not solidified.

It is preferable from the point of view of increase of adsorption capacity that the refrigeration temperature is as low as possible if the laser gas medium is not solidified.

When the KrF excimer laser is operated, the laser gas medium containing desired components is fed into the laser tube 1 through the valve 4 so as to be circulated through the adsorption tower 9 by opening the valves 6 and 7 and, at the same time, electric discharge is started to produce laser oscillation. The laser gas medium is fed into the adsorption tower 9 through the valve 6, so that the purified gas re-circulates into the laser tube 1 through the pump 8 and the valve 7 after impurities are adsorbed in the adsorbent.

Because the adsorbent 10 is preliminarily saturated with Kr exhibiting the strongest adsorption force among the components of the laser gas medium, there is no component adsorbed newly among the components of the laser gas medium. Accordingly, when impurities touch the adsorbent, impurities are adsorbed preferentially replacing Kr which has been already adsorbed. If Kr thus desorbed due to the adsorption of impurities is added to the laser gas medium, the concentration of desorbed Kr is not so high to change the condition for laser oscillation because the concentration of impurities is very low. Accordingly, laser oscillation for a long time can be made by using the laser gas medium being normal in a constant condition. When impurities appear at the outlet of the adsorption tower 9, impurity gases can be desorbed from the adsorbent 10 through the steps of: stopping the operation of the excimer laser; closing the valves 6 and 7 to stop the operation of the refrigerator to raise the temperature of the adsorption tower 9; and exhausting the gas through the valve 14 while injecting a purge gas through the valve 13. As well as the refrigeration pipe 12, a heater may be provided in the adsorption tower 9 to accelerate re-activation of the adsorbent 10 by positively heating.

As another method, the saturation adsorption of Kr may be made through the steps of: feeding the laser gas medium into the adsorption tower 9 through the valve 46 from the laser gas medium source before the starting of electric discharge; and exhausting the gas medium through the pump 8 and the valve 14. Further, the shortage of the adsorbed components of the laser gas medium may be supplied through the valve 4 while circulating the laser gas medium without saturation of adsorption in the adsorbent 10 in advance.

Figure 2:
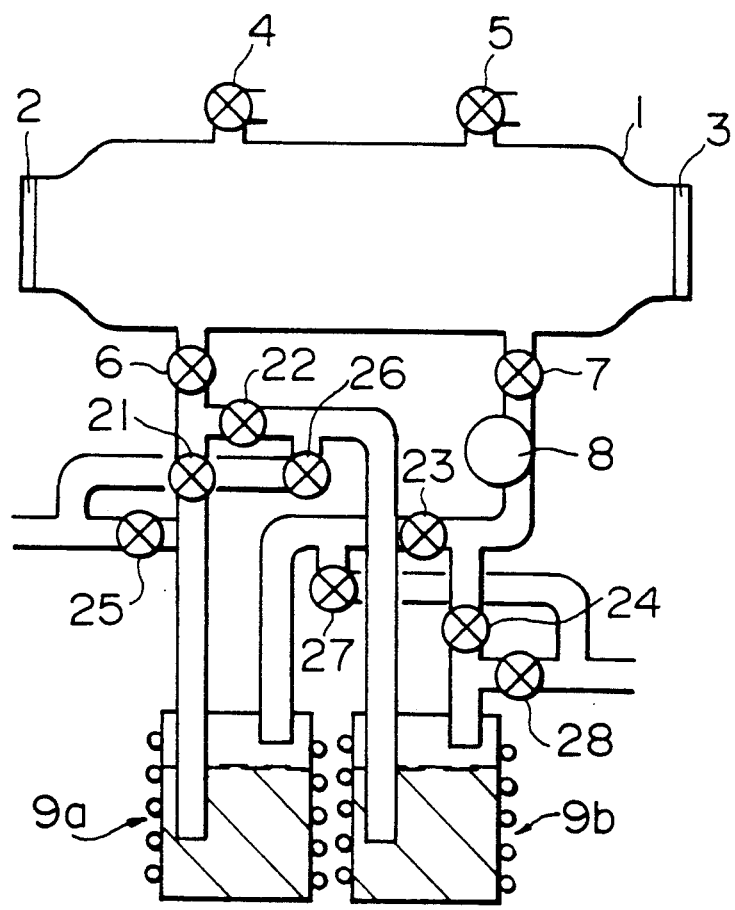
FIG. 2 is a schematic diagram showing a KrF excimer laser apparatus according to another embodiment of the present invention.

FIG. 2 shows a KrF excimer laser having another structure.

In FIG. 2, the laser tube 1 has mirrors 2 and 3 and is connected to various pipings through valves 4, 5, 6 and 7 in the same manner as shown in FIG. 1.

In this embodiment, two adsorption towers 9b and 9b are provided and the valves 6 and 7 are connected to the adsorption towers 9a and 9b through the valves 21, 22 and 23, 24, respectively. That is, the adsorption towers 9a and 9b can be selectively connected to the laser tube 1.

In this structure, for example, the adsorption tower 9a is first used. Laser oscillation is made while circulating the laser gas medium. When a considerable amount of impurity gas is adsorbed in the adsorbent in the adsorption tower 9a, the valves 21 and 23 are closed and at the same time the valves 22 and 24 are opened so that the adsorption tower 9b is connected to the laser tube 1 in replacement for the adsorption tower 9a. By exchanging adsorption towers as described above, the time in which the excimer laser can be operated continuously can be elongated. While the excimer laser is operated by using the adsorption tower 9b, the adsorbent in the adsorption tower 9a can be re-activated. When the adsorption capacity in the adsorption tower 9b is lowered, the adsorption tower 9b is replaced with the recovered adsorption tower 9a. The excimer laser apparatus can be operated continuously for a desired time through changeover of the adsorption towers and by re-activating the adsorbent in the adsorption towers. Though the refrigerator is not shown in the drawing, the adsorption towers may have respective refrigerators or the respective refrigeration pipes of the adsorption towers may be selectively connected to a single refrigerator. Each of the adsorption towers is similar to the adsorption tower shown in FIG. 1.

Although the present invention has been described in conjunction with the preferred embodiments, the invention is not limited to these specific embodiments. For example, the invention can be applied to purification of multicomponent gas media other than the excimer laser gas medium. It is to be understood by those skilled in the art that various changes, modifications, combinations, etc. thereof may be made without departing from the spirit of the appended claims.

I claim:

1. A KrF excimer gas laser apparatus comprising:
   a laser tube for containing a laser gas medium comprising Kr and $F_2$ and for emitting laser light;
   an adsorbent vessel connected to said laser tube to form a circulation path and containing an active carbon adsorbent; and
   a refrigerator for refrigerating the inside of said adsorbent vessel to a predetermined temperature;
   said adsorbent containing a surface, which when refrigerated, exhibits adsorption forces with respect of both at least one component of said laser gas medium and gaseous impurities comprising $CF_4$ which are desired to be removed.

2. The apparatus according to claim 1, wherein laser gas medium comprises Kr, $F_2$ and Ne.

3. A method for purifying a multicomponent gas medium of a KrF excimer laser containing a plurality of gaseous components comprising Ne, Kr and $F_2$, the method comprising:
   (a) contacting an active carbon adsorbent with Kr which exhibits the strongest adsorption force among all of said components to adsorb Kr on the adsorbent,
   (b) circulating said multicomponent gas medium through said adsorbent which is refrigerated to a temperature which is not so low that any of the components of said multicomponent gas medium are solidified and
   (c) removing gaseous impurities comprising $CF_4$ from said multicomponent gas medium and hence releasing Kr.

4. The method according to claim 3, wherein in step (c) Kr is in a concentration greater than 870 ppm.

5. The method according to claim 3, wherein the adsorbent is refrigerated to a temperature which is higher than the temperature of liquid nitrogen and lower than the temperature of dry ice.

6. A method for performing a laser oscillation in a gas laser apparatus while circulating a laser gas medium comprising Kr and $F_2$, the method comprising:
   (a) adsorbing on an active carbon adsorbent a gas comprising Kr or Kr and $F_2$ which is weaker in adsorption force than gaseous impurities comprising $CF_4$ which are desired to be removed and
   (b) circulating said laser gas medium through said adsorbent which is refrigerated to a temperature which is not so low that any of the components of said laser gas medium necessary for laser oscillation are solidified, whereby the gaseous impurities are adsorbed on the adsorbent.

7. The method according to claim 6, which further comprises reactivating said adsorbent while stopping the refrigeration.

8. The method according to claim 6, wherein the adsorbent is refrigerated to a temperature which is higher than the temperature of liquid nitrogen and lower than the temperature of dry ice.

* * * * *